3,342,689
LIQUID-MODERATED, GAS-COOLED NUCLEAR REACTOR AND PRESSURE EQUALIZATION SYSTEM

Jean-Claude Gaudez, Gif-sur-Yvette, and Roland Roche, Clamart, France, assignors to Commissariat à l'Energie Atomique, Paris, France
Filed Aug. 17, 1965, Ser. No. 480,267
Claims priority, application France, Aug. 28, 1964, 986,578, 986,579
7 Claims. (Cl. 176—52)

ABSTRACT OF THE DISCLOSURE

A nuclear reactor has in a pressure vessel a reactor core and a heat exchanger. The reactor is gas cooled and liquid moderated. A circuit balances the moderator and coolant pressures. The calandria tank containing the moderator is suspended on the vertical calandria tubes which receive the fuel elements.

---

This invention relates to liquid-moderated gas-cooled nuclear reactors and more especially to nuclear reactors of the type comprising a moderator tank located within a general containment vessel which is designed to resist the pressure of the coolant gas. The term "gas" as used in this context must of course be taken in a very general sense, including emulsions and either dry or saturated steam.

Up to the present time, two design solutions have been adopted in the construction of liquid-moderated gas-cooled reactors. In one solution, the coolant gas circulates through pressure tubes which form channels for receiving fuel elements: this arrangement renders it unnecessary to subject the moderator tank to the gas pressure and permits the use of a relatively lightweight tank.

In the other solution, provision is made for a large-sized calandria designed to resist the coolant-gas pressure which is also exerted on the moderator. This arrangement makes it possible to form the channels for accommodating fuel elements by means of calandria tubes of relatively small thickness.

It has been proposed to design a reactor of the second type (with calandria tubes) in which the functions of containment of liquid moderator and resistance to coolant-gas pressure are performed by different elements; a calandria or tank is designed to contain the moderator whilst a pressure vessel of substantial size (for example of prestressed concrete) which encloses the moderator tank and delimits the moderator gas circuit is designed to withstand the pressure of said gas in accordance with an arrangement which can be similar to that which is adopted in graphite-moderated gas-cooled reactors of the most recent types.

This solution makes it possible to employ a moderator tank having a relatively small thickness and light weight, provided that the pressures of the coolant gas and of the moderator are equalized by pressure-balancing means.

However, the equalization of pressure sets a certain number of problems. In particular, the pressure of the coolant gas varies along its circuit as a result of pressure drops and also varies at a given point as a function of the gas flow rate. The pressure exerted by the moderator fluid varies with the temperature. In point of fact, the effects which are produced by a difference between the coolant gas pressure and the moderator pressure, especially on the calandria tubes which constitute the most delicate elements, vary according to the direction in which such a pressure difference is exerted. Accordingly, excess moderator pressure tends to produce local buckling of the calandria tubes in a transverse cross-sectional plane, whereas excess coolant gas pressure tends to produce buckling of the calandria tubes in longitudinal compression as well as buckling of the calandria shell (if the calandria or moderator tank is of the vertical-axis cylindrical type). Finally, it is necessary to take into account the expansion of the moderator between room temperature and operating temperature.

None of the solutions proposed up to the present time has solved the problem thus encountered. Since full pressure-equalization cannot be achieved, such solutions have entailed the need for calandria tubes of substantial thickness which therefore have a high neutron-absorption cross-section.

The object of this invention is to provide a reactor which meets practical requirements more effectively than designs which have been proposed up to the present time, particularly insofar as said reactor permits of satisfactory pressure equilibrium in spite of the two contradictory conditions referred to above.

To this end, the invention proposes a reactor comprising a circuit for equalization of the coolant gas pressure and the moderator fluid pressure so as to equal the minimum pressure of the coolant gas and maximum presssure of the moderator fluid within their respective circuits, and a calandria or moderator tank which is suspended from the calandria tubes.

In order to achieve the result outlined above, it is merely necessary to equalize the coolant gas pressure upstream of the circulating blowers and the moderator pressure at the bottom of the tank. Thus the coolant pressure is always at least equal to that of the moderator and the pressure forces always produce action in the same direction in which there is accordingly no danger of buckling of the calandria tubes in a transverse sectional plane. So far as concerns the danger of buckling of the calandria tubes as a result of axial compression, this is prevented by virtue of the suspension of the tank, by reason of the fact that at least a part of the weight of the tank is transferred to the calandria tubes which are thus subjected to tensile stresses.

In a preferred but non-limitative form of embodiment, the pressure equalization circuit comprises at least one vessel which is divided into two compartments by means of a movable partition and pipes for supplying coolant fluid to one of said compartments and moderator to the other compartment.

The choice involving maintenance of a gas pressure which is higher than the moderator pressure has also taken into account the consequences of failure either of a calandria tube or of its junction with the tank. In point of fact, it is preferable that the coolant gas should have a tendency to penetrate into the tank and to drive the moderator which is a costly product (usually heavy water) towards storage containers in which it can be recovered rather than that the moderator should be sprayed throughout the pressure containment vessel: in this latter instance, it would in fact prove difficult to recover the moderator in corners and bottom locations, particularly while avoiding any adulteration due to heat-insulating material, oxidation of steel and the like; and such moderator material would then be liable to give rise to corrosion.

Among other advantages of the advantages of the arrangement which has just been described with respect to designs which entail the use of pressure tubes, the following can be noted in particular:

An appreciable reduction in thickness of the tank and especially of the calandria tubes which results in a reduction in neutron absorption;

The possibility of employing design solutions which have already withstood the test of time in the field of graphite-moderated and carbon dioxide gas cooled reactors: in particular, it is possible to adopt the arrangement which consists of an "integrated" heat exchanger located within a prestressed concrete vessel which also contains the reactor core.

The problem which is set by the expansion of the moderator between room temperatures (of the order of 20° C.) and operating temperatures (of the order of 100° C:) can be solved in two different ways. Either the volume which is in excess during operation can be stored or the moderator can be heated each time before the reactor attains criticality. The disadvantage of the first solution is that a considerable mass of moderator fluid is immobilized, thus increasing the operating cost of the power plant. The second solution has a disadvantage in that it calls for a heating plant and that considerable precautions have to be taken in order to minimize the consequences of any error of operation which would result in cooling of the moderator (the coolant gas must penetrate within the tank in order to prevent any compression of this latter).

One preferred form of embodiment of the invention calls for the use of the first solution and provides for the storage of moderator (usually heavy water). Direct contact between the coolant gas (usually carbon dioxide gas) and the moderator (heavy water) is to be avoided. It would fail to balance the pressures as hereinabove set forth; gas would be solved in the heavy water, would increase the pH value of the heavy water; and the moisture content of the carbon dioxide gas would be increased.

The invention overcomes the disadvantages stated above by making provision for a pressure equalization vessel in which a movable partition is interposed between moderator and coolant. Said partition can be formed by an insulating liquid film such as a layer of silicone oil. This layer must evidently be located permanently outside the core radiation field and this solution gives rise to a large number of physico-chemical problems. Accordingly, in a preferred form of embodiment, this invention calls for the use of solid pistons which are slidably mounted within a vessel for the storage of the expanded volume.

In any case, the pressure equalization devices are preferably placed in the circuits for the purification of gas and moderator fluid upstream of the processing apparatus so as to permit the possibility of monitoring any relative contamination which may occur accidentally and of reducing such contamination.

The invention also consists in other arrangements which can advantageously be employed in conjunction with the preceding but which can also be employed independently thereof. All of these arrangements will become more readily apparent from a perusal of the following description of one particular mode of application of the invention which is given solely by ways of example and not in any limiting sense. Reference is made in the description to the accompanying drawings in which.

Figure 3:
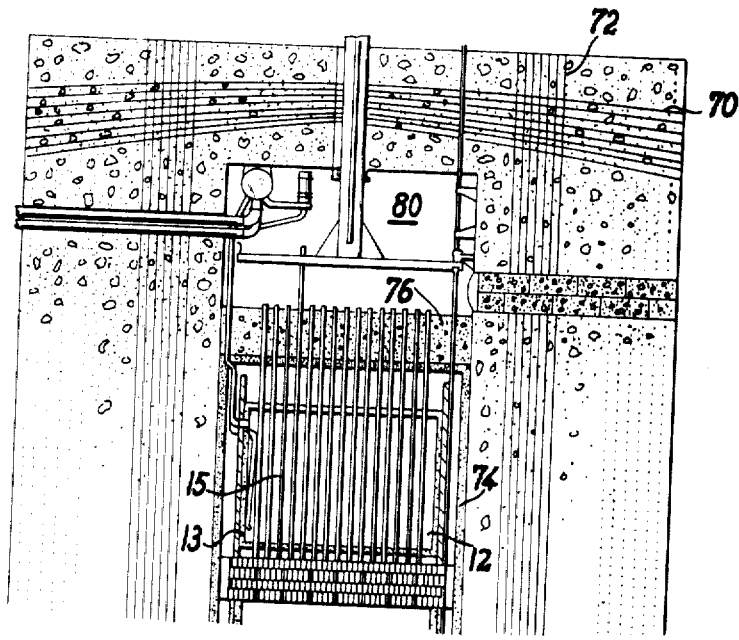
FIG. 3 is a vertical sectional view of the top portion of a nuclear reactor in accordance with the invention.
Figure 4:
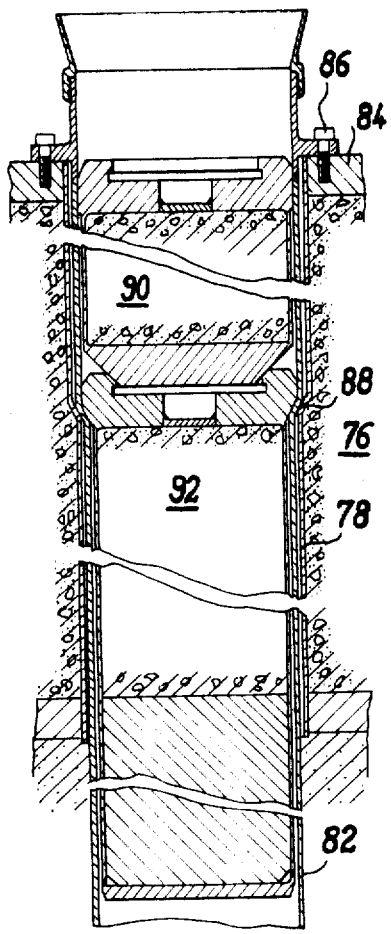

And FIG. 4 is a vertical sectional view of a detail of FIG. 3 showing the top extension of a calandria tube at the point at which it passes through the tube slab.

Figure 1:
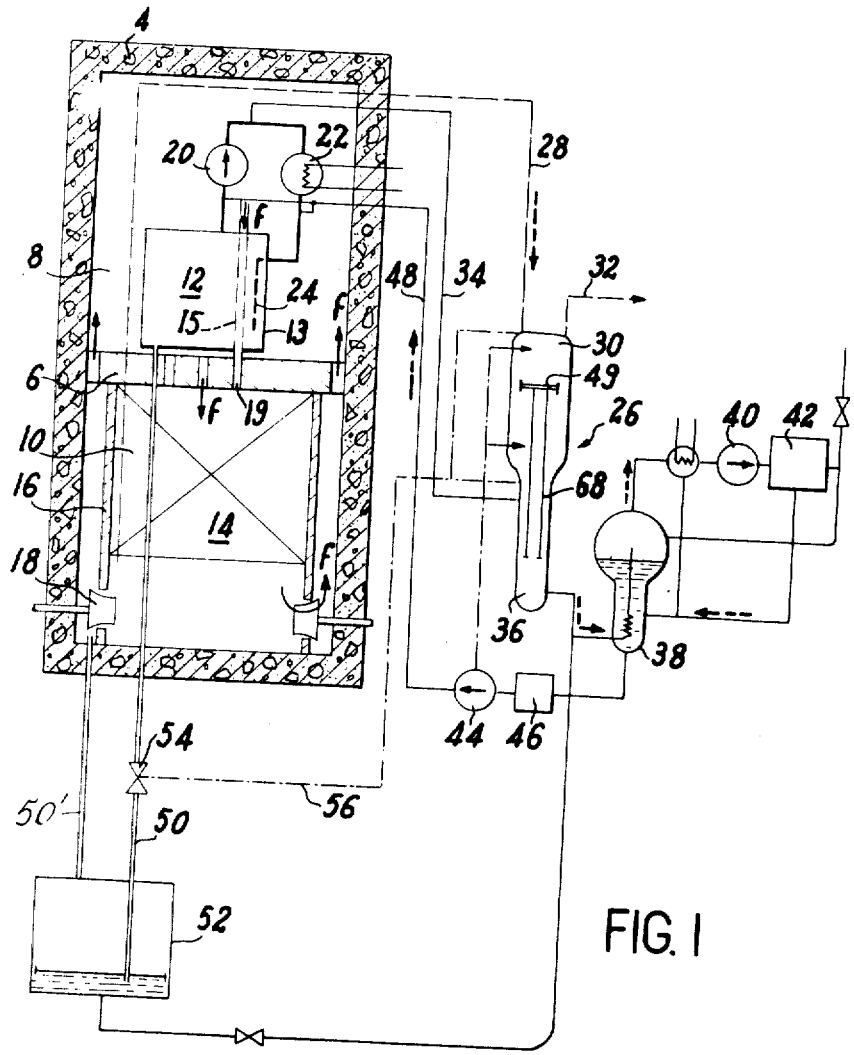
FIG. 1 is a very diagrammatic view of a reactor in accordance with the invention and its associated circuits.

FIG. 1 shows diagramatically a reactor comprising a containment structure which provides both biological protection and resistance to coolant gas pressure. Said containment structure consists of a prestressed concrete vessel 4 which is lined with a leak-tight membrane and in certain cases with heat-insulating material (not shown in the drawings). There is formed within the concrete pressure vessel 4 an internal chamber having a substantially cylindrical shape and a vertical axis, said chamber being divided by a horizontal support plate 6 into two superposed compartments 8 and 10 which contain respectively the reactor core 12 and a heat exchanger 14 which transfers heat from the carbon dioxide gas which serves as coolant to a secondary fluid (usually water).

The reactor core 12 consists of a tank 13 or calandria designed to contain the heavy water employed as moderator, said tank being traversed by calandria tubes which are intended to contain fuel element assemblies and only one of which is shown in broken lines in the drawings, namely the tube 15. The tank is suspended by the calandria tubes, as will be explained later, from a tube-plate or slab which can form the top portion of the containment vessel 4. Only the fuel element assemblies rest on the support plate 6 which provides partial biological shielding for the heat exchangers 14. The support plate 6 is carried on a skirt 16.

The coolant gas is circulated by means of blowers 18 along a closed circuit which is indicated by arrows $f$ in FIG. 1 and which comprises in serial arrangement: the calandria tubes, ducts 19 formed in the support plate 6, the heat-exchanger compartment 10, the annular space between the skirt 16 and the containment vessel 4, and the compartment 8.

A so-called "moderator" circuit is provided for the purpose of preventing overheating of the heavy water: this circuit, which is shown in thick, full lines in FIG. 1, is placed within the containment vessel in the top portion of compartment 8. Said circuit comprises pumps 20 which serve to draw-off water from the top portion of the tank 13 and direct said water to heat exchangers 22 in which the water is cooled, then returned to pipes 24 to be distributed by these latter to the bottom of the tank 13.

Figure 2:
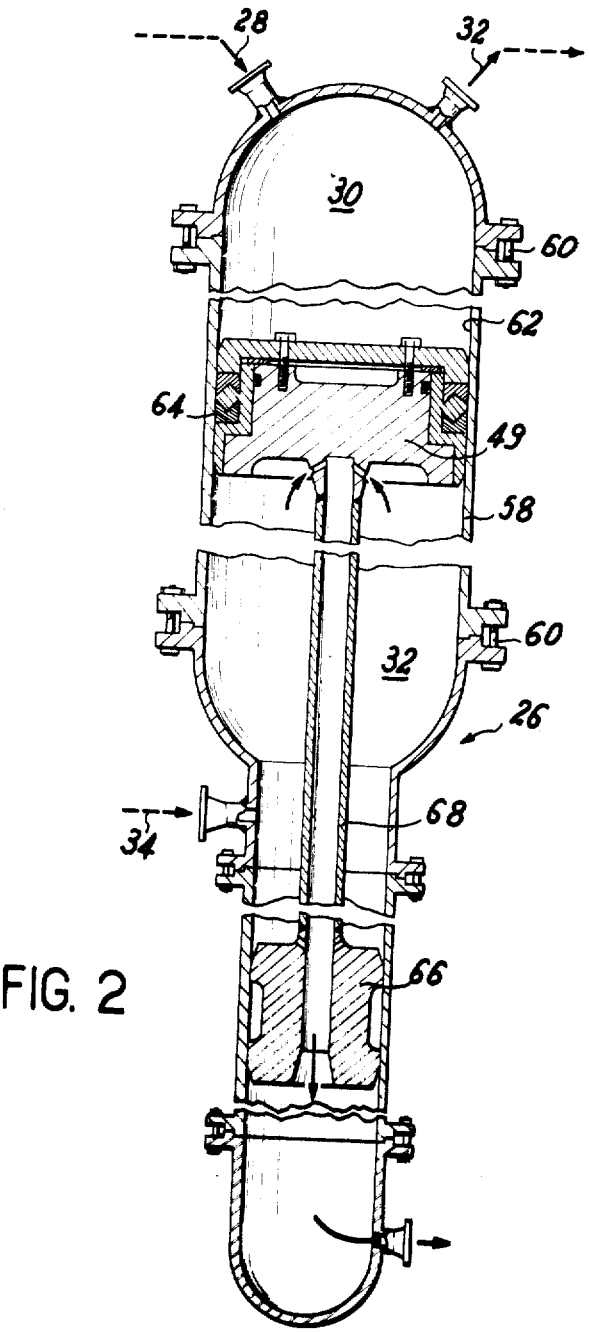
FIG. 2 shows a pressure equalization vessel which is represented in cross-section on a plane passing through its axis.

The circuit for equalizing the pressures of heavy water and carbon dioxide gas comprises a portion which is occupied by heavy water and another portion which is occupied by the gas, both portions being connected to a plurality of identical pressure equalization vessels 26 (as shown in FIG. 2) which are mounted in parallel and placed outside the reactor containment vessel 4.

That portion of the circuit which is occupied by the coolant gas (carbon dioxide gas) comprises an inlet pipe 28 (shown in broken lines in FIG. 1) which connects one point of the coolant gas circuit located downstream of the heat exchanger 14 to the upper compartment 30 of each pressure equalization vessel 26. A second pipe 32 connects the compartment 30 to a carbon dioxide regeneration device (not shown) which serves to monitor any contamination which may occur within the pressure equalization vessels 26. The regenerated gas is returned to the coolant gas circuit through pipes which have not been shown in the drawings.

That portion of the pressure equalization circuit which is occupied by heavy water comprises a pressure supply pipe 34 which connects the moderator circuit to the lower compartment 36 of each vessel 26. Since the equalization of pressure must be carried out at the maximum pressure of the heavy water, the pipe 34 is joined to the moderator circuit downstream of the pumps 20. The lower compartment 36 is also connected to a purification and degassing circuit which takes heavy water from the compartment 36 and returns it to the tank after processing. The purification and degassing circuit comprises a degassing flask 38 in which the heavy water is expanded and an ancillary recombination circuit. Said ancillary circuit essentially consists of a pump 40 and a catalytic recombination unit 42 in which the gases derived from radiolysis are recombined prior to being returned in liquid phase to the degassing flask.

The water is recirculated by a pump 44 which, when actuated by a control circuit (not shown in the drawings), returns the water through a pipe 48 to the moderator circuit via a purifier 46. Said control circuit is provided in particular with contacts for starting up and stopping the pumps at the top and bottom ends of stroke of the piston 49 which constitutes the movable partition of each pressure equalization vessel 26. The circulating pumps 44 thus transfer heavy water into the tank and prevent collapse of the latter in the event of reactor shutdown.

Provision is also made for a safety circuit consisting of a pipe 50 having a large cross-section and fitted with a valve 54 which connects the heavy water tank 12 to a storage tank 52 located beneath the reactor containment vessel. The valve 54 is remote-controlled from the pressure equalization vessels 26 via a line 56 which is shown diagrammatically in chain-dotted lines in FIG. 1. In the event of failure of a calandria tube, the pipe 50 in which the valve 54 is remote-controlled from the vessels 26 ensures rapid emptying of the tank 13 and prevents the greater part of the heavy water from passing through the entire containment vessel. In fact, the carbon dioxide gas in that case drives the heavy water towards the pressure equalization vessels 26 and, at the same time, the heavy water tends to flow towards the bottom of the reactor containment vessel under the pressure of the column of liquid. Furthermore, in the event of leakage of heavy water, said pipe 50 prevents any compression of the tank by the gas. A pipe 50' connects tank 52 and the interior of pressure vessel 4.

The pressure equalization vessels are of sufficient number to prevent any storage of excess volume between room temperature and operating temperature. The vessel 26 which is illustrated by way of example in FIG. 2 consists of a stationary cylinder 58 having a vertical axis and formed of a number of components assembled by means of bolts such as the bolt 60. A piston 49 which is movable within the cylinder bore 62 and fitted with a packing-ring 64 separates the lower compartment 36 containing heavy water from the upper compartment 30 containing carbon dioxide gas.

The piston 49 is free but is guided in its movements by a terminal extension unit 66 which is slidably mounted in the small-diameter lower portion of the compartment 36 and which is joined to the piston by means of a rigid connecting-rod 68. The connecting-rod 68 and sliding unit 66 are both tubular and pierced by apertures in order to provide a communication between the two portions of the compartment 36 which are located on each side of the sliding unit.

Numerical data corresponding to a 500 mw.(e) reactor in accordance with the invention as shown partially in FIGS. 3 and 4 will now be given.

The core 12 has an approximate diameter of 7 meters and a height of 5 meters, and contains 530 calandria tubes 15 disposed on a triangular lattice with a pitch of 280 mm. Each fuel asembly is 1000 mm. in length and is composed of 31 fuel elements each formed by a stack of uranium oxide pellets encased in a beryllium tube.

The coolant gas (carbon dioxide) is at a mean pressure of 80 bars. The inlet and outlet temperatures of the coolant within a calandria tube 15 are respectively 260° C. and 500° C.

The general shape of the prestressed concrete containment vessel 4 is that of a vertical cylinder closed by two end walls. The thickness of the top end wall which is alone visible in FIG. 3 is 4.9 meters. The horizontal cross-section of the cylindrical wall is limited internally by a circle 10.5 meters in diameter and externally by a hexagon 27.3 meters in width across the flat portions; the minimum thickness of concrete is 8.4 meters. The hexagonal shape results in an economy of concrete and in less substantial variation in thickness of the side wall, thus having a favorable effect on the good operation of the structure. The total height of the containment vessel is 48.5 meters.

The side wall is prestressed by means of three curved horizontal reinforcement systems such as 70, the anchoring elements of which are located in the two opposite faces of the hexagon and by vertical rectilinear reinforcements such as 72. The prestressing of the end walls is carried out by means of substantially horizontal cables forming a triangular lattice which has not been shown in the figure.

The leak-tight lining membrane 74 is of mild steel 25 mm. in thickness.

The tube slab 76 which is 2 meters in height and 10.5 meters in diameter, is a metallic assembly consisting of a tube grid 78 (as shown in FIG. 4) in which is placed concrete for providing biological shielding between the reactor core 12 and a "garret" 80.

The extension 82 of each calandria tube 15 traverses the tube slab 76 and is secured to the top plate 84 of said slab by means of screws such as the screw 86. A change in diameter 88 near the center of the tube slab 76 is made so as to prevent any direct leakage of neutrons emanating from the reactor core and so as to serve as a support for the biological shield plugs 90 and 92.

The tank 13 which contains heavy water consists of a shell, two end walls and calandria tubes 15 by means of which said end walls are joined to each other. The material employed for the tank is an 18/8 austenitic stainless steel and the material employed for the calandria tubes 15 is Zircaloy. The shell is a cylindrical barrel-plate 30 mm. in thickness and reinforced by a hoop whilst the end walls are each formed of a single plate of small thickness (50 mm. approximately). The calandria tubes 15, the walls of which have previously been cold worked, are joined by expansion to said end plates. The tank is suspended from the stationary tube slab 76 by means of the upper extensions 82 of the calandria tubes 15.

The arrangement which has just been described makes it possible to reduce the thickness of the calandria tubes to a value of the order of 1.5 mm.

The reactor pressure equalization circuit (in which 200 cubic meters of heavy water are employed) makes it necessary to store approximately 10 cubic meters when the temperature of the heavy water increases from 20° C. to 120° C. This excess volume can, for example, be divided among twelve pressure equalization vessels having a bore of 800 mm. and an overall length of the order of 10 meters.

As will be readily understood, this invention is not limited to the example of construction which has been described and illustrated. Any alternative modes or forms of construction may be adopted without thereby departing either from the scope or the spirit of the invention.

What is claimed is:

1. Liquid-moderated, gas-cooled nuclear reactor comprising a tank receiving said moderator and located in a pressure vessel, vertical calandria tubes traversing said tank and receiving fuel elements, a heat exchanger in said pressure vessel, blowing means for circulating said gas coolant inside said pressure vessel along a heat exchange circuit including said calandria tubes and heat exchanger and means for equalization of the minimum pressure of the coolant gas upstream of said blowing means with the maximum pressure of the liquid moderator in said tank, said tank being suspended from said calandria tubes.

2. Liquid moderated, gas cooled nuclear reactor comprising a tank receiving said moderator and located in a pressure vessel, a heat exchanger in said pressure vessel, vertical calandria tubes traversing said tank and extending upwardly out of said tank and receiving fuel elements, blowing means for circulating said gas inside said pressure vessel along a heat exchange circuit including said calandria tubes and said heat exchanger and means for equalization of the minimum pressure of the coolant gas in said heat exchange circuit and the maximum pressure of the liquid moderator, the lower wall of said tank being connected to said calandria tubes and suspended thereon and exerting tensile stresses on said calandria tubes.

3. Nuclear reactor according to claim 1 wherein said equalization means comprises a vessel, a movable partition separating said vessel into two chambers and means for respectively connecting one of said two chambers to the moderator circuit and the other of said two chambers to the coolant circuit.

4. Nuclear reactor according to claim 3, said partition consisting of a layer of liquid lighter than the moderator and not miscible therewith.

5. Nuclear reactor according to claim 3, said partition comprising a piston slidable in and fluid tight with a cylindrical portion of said vessel.

6. Nuclear reactor according to claim 1, said pressure vessel being a prestressed concrete vessel providing coolant pressure containment and biological protection.

7. Nuclear reactor according to claim 2, wherein said tank is connected by projecting portions of said calandria tubes to a tubular assembly secured to said pressure vessel.

References Cited

UNITED STATES PATENTS

| | | | |
|---|---|---|---|
| 3,170,846 | 2/1965 | Blumberg | 176—60 |
| 3,205,140 | 9/1965 | Coudray et al. | 176—60 |

FOREIGN PATENTS

| | | |
|---|---|---|
| 627,803 | 9/1961 | Canada. |
| 1,163,494 | 4/1958 | France. |
| 849,308 | 9/1960 | Great Britain. |

L. DEWAYNE RUTLEDGE, *Primary Examiner.*